Patented June 30, 1931

1,811,959

UNITED STATES PATENT OFFICE

JULIUS A. NIEUWLAND, OF NOTRE DAME, INDIANA, ASSIGNOR TO E. I. DU PONT DE NEMOURS & COMPANY, OF WILMINGTON, DELAWARE, A CORPORATION OF DELAWARE

VINYL DERIVATIVES OF ACETYLENE AND METHOD OF PREPARING THE SAME

No Drawing.     Application filed September 13, 1928. Serial No. 305,866.

This invention relates to a process for controlling acetylene reactions and for bringing about the reaction of acetylene with other substances. More particularly it relates to the use of cuprous chloride in acetylene reactions as a catalyst.

This application is a continuation in part of application Serial No. 153,210, filed December 7, 1926 and of application Ser. No. 564,595 filed May 29, 1922.

It is well known that at ordinary temperatures acetylene does not readily enter into controllable reactions with other substances. Catalysts have been used in the past to overcome this difficulty and to permit the commercial use of acetylene in other than high temperature reactions. For instance, antimony pentachloride has been used as a catalyst for the preparation of acetylene tetrachloride by the chlorination of acetylene and mercury oxide and sulphate have been used for bringing about the combination of acetylene and water to form acetaldehyde. While the necessity of using a catalyst to obtain low temperature reactions of acetylene is well recognized, the number of substances known to be capable of bringing about such a catalytic reaction has been very limited, mercury being the outstanding acetylene catalyst.

This invention has as an object the providing of a suitable catalyst for bringing about those addition reactions of acetylene which result in vinyl derivatives thereof, meaning by vinyl derivatives, only those products of addition reactions of acetylene which contain the group $CH_2=CH-$ or its tautomeric form $CH_3CH=X$ where X is an atom of carbon, nitrogen, oxygen, sulfur, etc., bound by two bonds to the ethylidene group $CH_3CH=$.

These objects are accomplished by the use of cuprous chloride as a catalyst for controlling acetylene reactions. The following specific examples are furnished to illustrate the use of cuprous chloride in such reactions.

*Example 1.*—A mixture of 2 parts finely divided cuprous chloride and 100 parts aniline is prepared and acetylene gas introduced at slightly elevated temperatures, for example, between 70° and 110° C. Reaction takes place with the production of ethylidene aniline, its polymerization products and other complex products. It will be noted that the cuprous chloride is here used as a dry solid.

*Example 2.*—In the preferred embodiment of the invention, a mixture of ammonium chloride, water, cuprous chloride, and copper powder is prepared in the proportions of 945 grams ammonium chloride, 1000 grams water, 2850 grams cuprous chloride, and 100 grams copper powder. This solution will obviously show an acid reaction due to the ionization of the chlorides. This mixture is agitated thoroughly while passing into it acetylene gas. Rapid absorption of the gas takes place with the formation of a yellow to maroon colored precipitate. The temperature may rise as high as 50° C., during the course of reaction without causing trouble, but it is preferable to hold it down to about 25° C. by suitable cooling of the reaction mass. When the reaction slows up, as shown by a decrease in the rate of absorption of acetylene, the operation is discontinued, and the highly unsaturated hydrocarbon product formed is obtained by distillation. The distillation is stopped when the hydrocarbon condensed is mixed with much water. The water is separated and returned to the reaction mass which, after cooling, is ready for the absorption of more acetylene. This cycle of operation can be repeated indefinitely and a given lot of copper may be thus used for the conversion of an indefinite amount of acetylene.

One of the higher hydrocarbons of the acetylene series thus formed has the formula: $H_2C=CH-C\equiv C-CH=CH_2$, or divinyl acetylene. It is a very reactive, low-boiling hydrocarbon. The above described method of preparation and isolation permits of the ready production of this new compound. There is also produced at the same time a substantial quantity of other unsaturated hydrocarbons of indefinite constitution. Two of these hydrocarbons of polymers of acetylene have the empirical formula $C_8H_8$ and $C_4H_4$, respectively. Monovinyl acetylene has been definitely identified as a constituent of the compounds having the formula $C_4H_4$. An octatriene having the formula

has been identified as a constituent of the product having the formula $C_8H_8$. It will be understood therefore that by the appended claims it is the intention to cover those unsaturated acetylene polymers which are obtained as a product of the reaction, collectively as well as individually.

*Example 3.*—The introduction of acetylene into a mixture of 1000 parts of ammonium chloride, 3000 parts of cuprous chloride, 1000 parts of hydrochloric acid of specific gravity 1.194 and 100 parts of copper powder, when the mixture is saturated with ammonium chloride and more than saturated with cuprous chloride, results in the formation of a gray to white precipitate. Upon subsequent heating, this reaction mass evolves a mixture of products containing vinyl chloride and unreacted acetylene. The reaction is preferably carried out at from 20° to 40° C.

In preparing the absorbing mixture, the preceding proportions need not be adhered to rigidly. In the processes of Examples 2 and 3, it is desirable for optimum results that the amount of ammonium chloride used be sufficient to effect substantially complete saturation of the liquid phase and that the cuprous chloride be more than sufficient for complete saturation. These conditions, however, are not essential. The hydrochloric acid in Example 3 may be the ordinary concentrated aqueous solution or may be richer in hydrochloride acid. The function of the copper powder is merely to insure that all of the combined copper is present in the cuprous form, as cupric copper causes undesirable side reactions. Cupric copper is, therefore, best reduced with copper before starting.

Equivalents may be used for the reagents named, as for example, a mixture of cupric chloride and a reducing agent may be substituted for cuprous chloride and other ammonium salts may be used instead of ammonium chloride or even a cyclic nitrogen base such as pyridine. Upon the admixture of such ammonium compounds with the cuprous chloride solution, due to ionization, substantial amounts of ammonium chloride or of the hydrochloride of the tertiary amine will necessarily be formed.

The method of carrying out the absorption described may also be varied to a large extent. The acetylene may be introduced into the absorption mixture under pressure, and the pressure may be maintained upon such mixture for a suitable length of time to permit complete absorption and reaction. If desired, the reaction mixture may be kept at elevated temperatures to assist in carrying out the desired reactions. In reactions analogous to that of Example 3, instead of making up a mixture containing hydrochloric acid, the steps of the process may be changed to absorb the acetylene in the cuprous chloride-ammonium chloride mixture, with a subsequent introduction of hydrochloride acid gas under pressure into the absorption mixture.

It will be understood from the above examples that the precise method in which the cuprous chloride is used can be varied widely to suit the particular reaction involved. Accordingly, it may be used alone as a dry solid or the solid may be suspended in an inert medium, such as benzene or chlorbenzene. Such a medium may be advantageously mixed with the catalyst, for example in the vinyl chloride or the divinyl acetylene reactions to serve as a solvent medium for the acetylene and reaction products and to facilitate the sub-division of the catalyst mixture when agitated. In the reaction between aniline and acetylene, chlorbenzene may be added to moderate the vigor of the reaction and aid to control the temperature of the reaction. Also, as appears from Examples 2 and 3, the cuprous chloride may be dissolved or partially dissolved in the medium. Instead of an inert medium a reactive medium, as aniline, may be employed, or a hydrochloric acid solution or a solution of an alkali chloride as sodium, potassium and ammonium chloride may be employed as the medium.

In all of the above examples, reactions of acetylene are brought about by the agency of cuprous chloride in suitable media.

As many apparently widely different embodiments of this invention may be made without departing from the spirit and scope thereof, it is to be understood that I do not limit myself to the specific embodiments thereof except as defined in the appended claims.

I claim:

1. In the process of preparing vinyl derivatives of acetylene the step of reacting the acetylene in the presence of a non-aqueous cuprous chloride catalyst.

2. In the process of preparing vinyl derivatives of acetylene the step of reacting acetylene in the presence of a non-alkaline catalyst comprising cuprous chloride.

3. In the process of preparing vinyl derivatives of acetylene the step of reacting the acetylene in the presence of an aqueous acid reacting solution prepared from cuprous chloride and an ammonium compound of the class consisting of ammonium salts and cyclic nitrogen bases.

4. In the process of preparing vinyl derivatives of acetylene step which comprises passing acetylene into a substantially saturated acid reacting aqueous solution prepared from ammonium chloride, and a cuprous salt and maintaining the latter in the cuprous condition during the progress of the reaction.

5. The process of claim 4 wherein the solution is substantially saturated with cuprous chloride and ammonium chloride.

6. The method of producing from acetylene a hydrocarbon of higher molecular weight which comprises reacting acetylene in the presence of an aqueous acid reacting saturated solution of cuprous chloride and an ammonium compound of the class consisting of ammonium salts and the cyclic nitrogen bases, the acidity of said solution corresponding to the acidity resulting from the ionization of the cuprous chloride and ammonium compound.

7. The method of producing from acetylene a hydrocarbon of higher molecular weight which comprises passing acetylene into an acid reacting aqueous solution of ammonium chloride, said solution containing cuprous chloride.

8. The method of producing from acetylene a hydrocarbon of higher molecular weight which comprises passing acetylene into a saturated aqueous solution of ammonium chloride and an undissolved excess of cuprous chloride, said solution containing also copper powder, agitating the mixture and distilling off the highly unsaturated hydrocarbon that is formed of higher molecular weight than acetylene.

9. The method of producing from acetylene a hydrocarbon of higher molecular weight which comprises passing acetylene into a mixture comprising ammonium chloride, water, cuprous chloride, and copper powder, agitating the mixture during the passage of the acetylene, obtaining by distillation the hydrocarbon formed, and continuing the process by further passage of acetylene into the reaction mass.

10. The process of producing from acetylene a hydrocarbon mixture containing a compound having the formula $C_4H_4$ which comprises passing acetylene into an aqueous acid reacting saturated solution of cuprous chloride and ammonium chloride, and maintaining an undissolved excess of the cuprous compound during the reaction.

11. The process of producing from acetylene a hydrocarbon mixture containing monovinyl acetylene which comprises passing acetylene into an aqueous acid reacting saturated solution of cuprous chloride and an ammonium compound of the class consisting of ammonium salts and pyridine.

12. A process of producing from acetylene a hydrocarbon mixture containing monovinyl acetylene which comprises bringing acetylene gas into contact with a catalyst mixture prepared from ammonium chloride, water, and cuprous chloride in substantially the proportion of 945 grams ammonium chloride, 1000 grams water, and 2850 grams cuprous chloride.

13. The process of making divinyl acetylene which comprises bringing acetylene gas into contact with a catalyst mixture of ammonium chloride, water and cuprous chloride in the proportions of substantially 945 grams ammonium chloride, substantially 1000 grams water and 2850 grams cuprous chloride.

14. A hydrocarbon mixture formed by bringing acetylene gas into contact with a catalyst mixture consisting of ammonium chloride, water, cuprous chloride and copper powder in the proportions of substantially 945 grams ammonium chloride, substantially 1000 grams water, 2850 grams cuprous chloride, and 100 grams copper powder.

15. A hydrocarbon mixture of higher molecular weight than acetylene that is formed by the process of claim 7.

16. A hydrocarbon mixture formed by the process described in claim 8.

17. Divinyl acetylene.

18. A catalyst mixture comprising a saturated aqueous acid reacting solution containing ammonium chloride and cuprous chloride, said mixture being adapted to promote the formation from acetylene of hydrocarbons of higher molecular weight.

19. An acid reacting catalyst mixture for acetylene reactions, said mixture consisting of ammonium chloride, water, cuprous chloride, and copper powder in substantially the proportions of 945 grams ammonium chloride, 1000 grams water, 2850 grams cuprous chloride, and 100 grams copper powder.

20. A catalyst mixture comprising a saturated aqueous acid reacting solution of cuprous chloride and an ammonium compound of the class consisting of ammonium salts and the cyclic nitrogen bases.

21. A non-benzenoid polymer of acetylene having the empirical formula $C_8H_8$.

22. A polymer of acetylene having the formula
$H_2C=CH-CH=CH-C\equiv C-CH=CH_2$

In testimony whereof, I affix my signature.
JULIUS A. NIEUWLAND.